United States Patent [19]

Yoshigai

[11] 4,275,615
[45] Jun. 30, 1981

[54] DEVICE FOR MOUNTING LEVER ASSEMBLY ON HANDLE BAR

[75] Inventor: Toshiharu Yoshigai, Higashi-Osaka, Japan

[73] Assignee: Yoshigai Kikai Kinzoku Kabushiki Kaisha, Osaka, Japan

[21] Appl. No.: 931,885

[22] Filed: Aug. 8, 1978

[30] Foreign Application Priority Data

Oct. 6, 1977 [JP] Japan ............... 52/135367[U]

[51] Int. Cl.³ .................. B62K 23/06; B62L 3/02; G05G 7/00
[52] U.S. Cl. .................................................. 74/489
[58] Field of Search .................. 74/488, 489; 403/353

[56] References Cited

U.S. PATENT DOCUMENTS

| | | | |
|---|---|---|---|
| 2,639,042 | 5/1953 | Lambert et al. | 403/353 X |
| 3,071,400 | 1/1963 | Bellock | 403/353 X |
| 3,485,112 | 12/1969 | Goosmann | 403/353 X |
| 3,522,745 | 8/1970 | Milosevic | 74/489 |
| 3,966,340 | 6/1976 | Morris | 403/353 |
| 4,005,613 | 2/1977 | Kaufman et al. | 74/489 |
| 4,014,195 | 3/1977 | Grogan | 403/353 X |
| 4,033,552 | 7/1977 | Kuzanov | 403/353 X |
| 4,084,449 | 4/1978 | Kine | 74/489 X |

FOREIGN PATENT DOCUMENTS

| | | | |
|---|---|---|---|
| 1025857 | 11/1949 | France | 74/489 |
| 983154 | 6/1951 | France | 74/489 |

Primary Examiner—Werner H. Schroeder
Assistant Examiner—Andrew M. Falik
Attorney, Agent, or Firm—Koda and Androlia

[57] ABSTRACT

A housing pivotably supporting an operating lever is mounted on a handle bar by a band. A nut with opposite end ears engaged in apertures formed in the ends of the band is held drawn into the housing by a bolt provided within the housing and extending through the nut in screw-thread engagement therewith to fasten the band to the handle bar. Each of the ears includes a shank projecting from each end of the nut and a flange formed at the outer end of the shank and having a portion remote from the center of the shank and a portion close to the shank center diametrically of the shank. Each of the apertures in the band is so shaped as to permit the flange to removably pass therethrough and to render the shank displaceable within the aperture, thereby making the band engageable with the inside surface of the flange.

1 Claim, 10 Drawing Figures

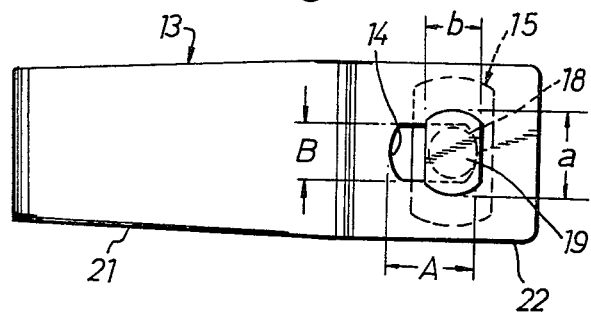
Fig. 4
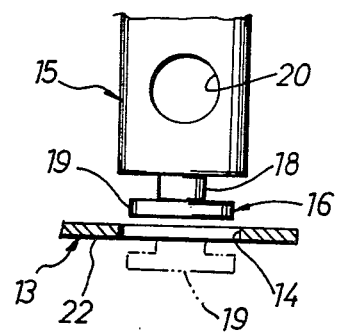
Fig. 5
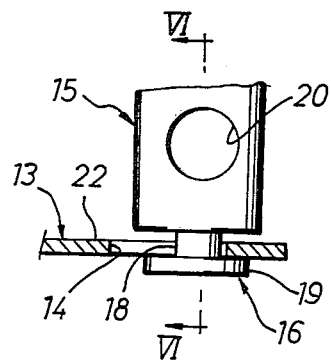
Fig. 6 (I)
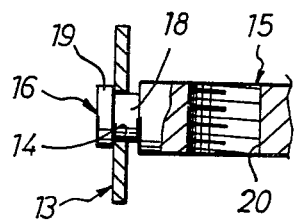
Fig. 6 (II)

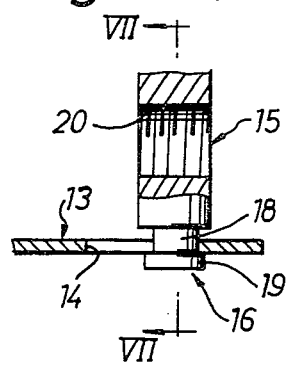
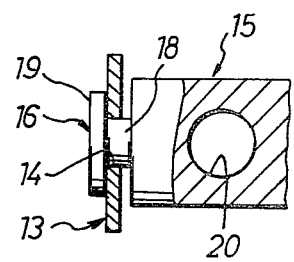
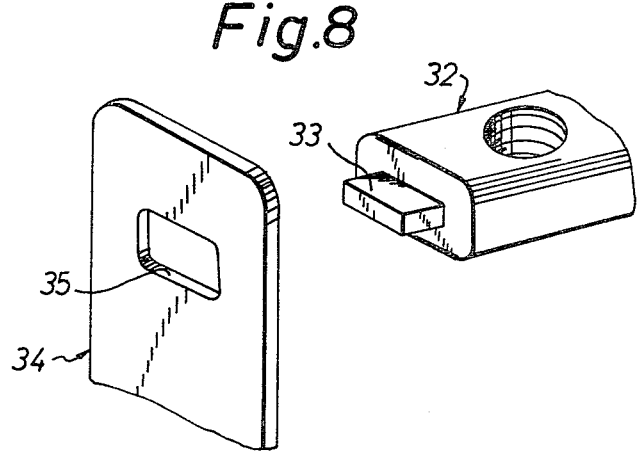

DEVICE FOR MOUNTING LEVER ASSEMBLY ON HANDLE BAR

BACKGROUND OF THE INVENTION

The present invention relates to a device for mounting a lever assembly on a handle bar, and more particularly to a device for mounting a brake or clutch operating lever assembly on a handle bar for use in bicycles or motor cycles.

Conventional devices for mounting a lever assembly on a handle bar, for example devices for mounting a brake operating lever assembly on the handle bar of a bicycle, comprise a housing pivotably supporting an operating lever, a fastening band fitting around the handle bar, a nut engaged at its opposite ends with the opposite ends of the fastening band, and a bolt provided within the housing and extending through the nut in screw-thread engagement therewith to draw the nut into the housing along with the ends of the fastening band and to thereby fasten the band to the bar. The nut has at its opposite ends projections engaged in apertures formed in the opposite ends of the fastening band which is made of thin steel sheet and so biased at all times as to bring the band ends out of engagement with the nut, so that the nut is held engaged with the band only in the direction in which it is pulled into the housing but is not held engaged with the band against the biasing force of the band. Accordingly when the nut holding bolt loosens during cycling, the nut will come out of engagement with the fastening band, resulting in the likelihood that the lever assembly will drop off the handle bar. Furthermore, before the bolt is screwed into the nut to mount the lever assembly on the handle bar, the ends of the fastening band must be inserted into the housing as held engaged with the nut by the hand. This requires a troublesome procedure.

SUMMARY OF THE INVENTION

An object of this invention is to provide a device in which when a bolt provided within a housing pivotably supporting an operating lever is screwed into a nut engaged with the opposite ends of a fastening band fitting around a handle bar, the nut is retained on the fastening band against disengagement therefrom so that the bolt can be screwed into the nut with ease.

Another object of this invention is to provide a device in which the nut is held engaged with the fastening band so that even when the nut holding bolt within the housing loosens, the housing is still retainable in place without inadvertently dropping off the fastening band.

Still another object of this invention is to provide a device in which the nut is tightly engageable with the fastening band to render the housing free of any backlash when it is mounted on the handle bar.

BRIEF DESCRIPTION OF THE DRAWINGS

FIG. 4 is a side elevation showing a fastening band with the nut held engaged therewith;

FIG. 5 is a fragmentary view partly in section and showing the nut before it is engaged with the fastening band;

FIG. 6(I) is a view partly in section and showing an ear of the nut as inserted in an aperture in the fastening band;

FIG. 6(II) is a view in section taken along the line VI—VI in FIG. 6(I);

FIG. 7(I) is a view partly in section and showing the ear of the nut held engaged in the aperture of the fastening band;

FIG. 7(II) is a view in section taken along the line VII—VII in FIG. 7(I); and

FIG. 8 is a fragmentary enlarged perspective view showing a conventional device for mounting a brake operating lever assembly on a handle bar for use in bicycles.

DESCRIPTION OF THE PREFERRED EMBODIMENTS

Figure 1:
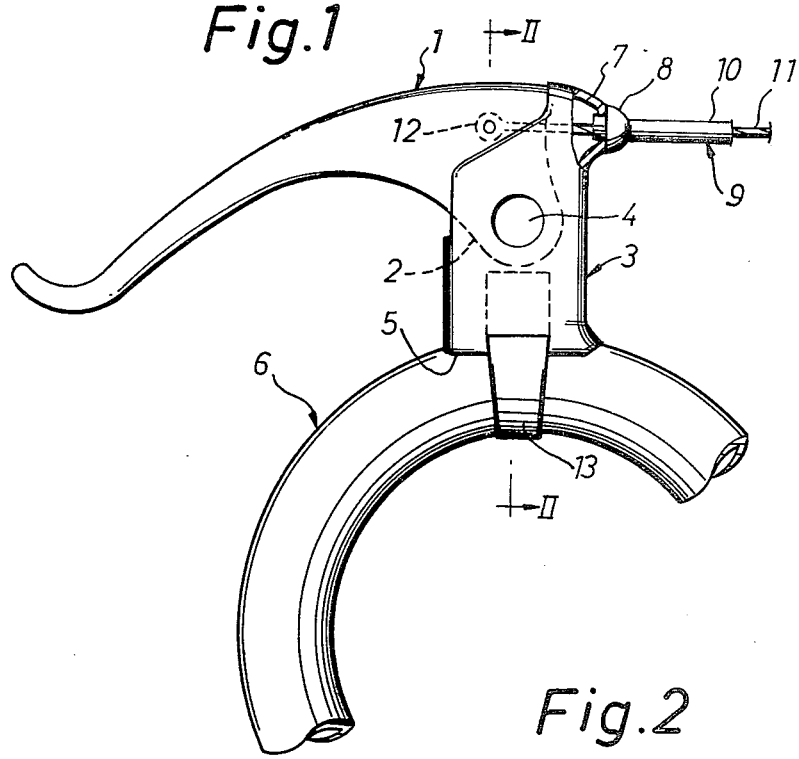
FIG. 1 is a side elevation showing an embodiment of this invention as used for a brake lever assembly on a bicycle.
Figure 2:
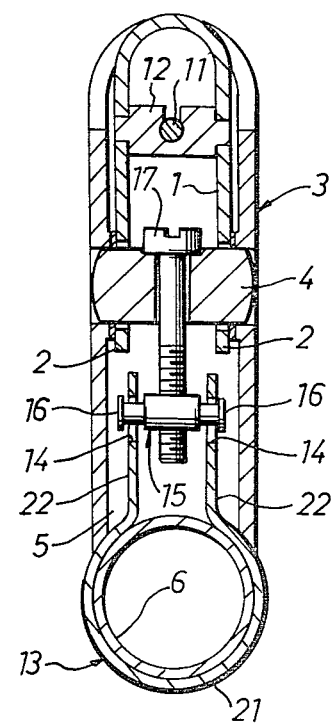
FIG. 2 is an enlarged view in section taken along the line II—II in FIG. 1.

With reference to FIGS. 1 and 2, an operating lever 1 which is made from light alloy and substantially U-shaped in cross section has base portions 2 inserted in a housing 3 and is turnable on a pivot 4 extending through the housing 3. The housing 3 has a lower open end 5 fitting to a handle bar 6. A support 8 is fitted in a boss 7 formed on the front wall of the housing 3. A bowden cable 9 comprises a wire casing 10 and an inner wire 11 extending therethrough. The wire casing 10 is supported at its one end by the support 8. The inner wire 11 extends through the support 8 into the housing 3. The end of the inner wire 11 is secured to a holder 12 provided in the operating lever 1 transversely thereof. The lever assembly is used for operating the brake device, such as caliper brake, of a bicycle. The lever 1, when turned on the pivot 4, pulls the inner wire 11, actuating the brake device connected to the other end of the bowden cable.

A fastening band 13 is in the form of a strip of thin steel sheet and fits around the handle bar 6. A nut 15 has opposite ears 16 engaging in apertures 14 formed in the opposite ends of the band 13. The nut 15 with the opposite ends of the band 13 engaged therewith is inserted in the housing 3 through its lower open end 5. A bolt 17 extends through the pivot 4 diametrically therethrough. Through a clearance formed between the lever 1 and the housing 3 when the lever 1 is turned, a screwdriver is inserted into the housing 3 to turn and advance the bolt 17 through the nut 15, pulling the nut 15 into the housing 3, whereby the band 13 is fastened to the handle bar 6 to mount the lever assembly on the handle bar 6.

Figure 3:
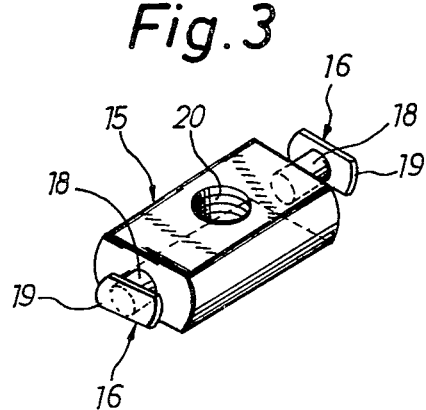
FIG. 3 is an enlarged perspective view showing a nut.

With reference to FIGS. 3 and 4, each of the ears 16 of the nut 15 includes a shank 18 having a circular cross section and projecting from each end of the nut 15 and a flange 19 at the outer end of the shank 18. The shank 18 is formed at its length longer than the thickness of the band 13. The flange 19 has a portion remote from the center of the shank 18 and a portion close to the center diametrically of the shank 18. With the present embodiment, the flange 19 is substantially in the form of a rectangle having long sides a and short sides b, the long sides a being positioned at right angles to the internally threaded portion 20 of the nut 15. The apertures 14 formed in the band 13 are elongated longitudinally of the band 13 and each have long sides A and short sides B. The apertures 14 are in conformity with the flanges 19 in shape and size, permitting the flange to pass therethrough. As seen in FIG. 2, the fastening band 13 has a substantially circular curved middle portion 21 fittable to the periphery of the handle bar 6 and is bent to provide parallel ends extending from the middle portion 21 and serving as legs 22.

The ears 16 of the nut 15 are engaged into the apertures 14 of the fastening band 13 in the manner to be described below with reference to FIGS. 5 to 7. FIG. 5 shows the ear 16 of the nut 15 as opposed to the aperture 14 of the fastening band 13. The flange 19 is then inserted into the aperture 14 as indicated in the broken line. The nut 15 with its shank 18 positioned in each aperture 14 is then turned through 90 degrees as seen in FIGS. 7(I) and 7(II), whereby the long sides a and A of the flange 19 and aperture 14 are positioned at right angles to each other with the band 13 in engagement with the inside surface of the flange 19. Since the band 13 has its legs 22 biased outward away from each other, the band 13 is held in tight and intimate contact with the flange inner surfaces. The band 13 is movable along the axis of the shank 18 between the flange 19 and the outerface of the nut 15 against the spring of the legs 22 when the bolt 17 is not screwed onto the nut 15. The band 13 is tightly engaged with the inside surface of the flange 19 when the bolt is screwed into the nut 15. As the result of the drawing operation of the nut 15 into the housing 3 by the bolt 17, the band 13 is automatically fittable around the handlebar 6 by the movement of the leg 22 along the axis of the shank 18 and the legs 22 are caused to move into alignment with the bolt 17. When the length of the short sides b of the flange 19 is made equal to the diameter of the shank 18 and the length of the short sides B of the aperture 14 is made substantially equal to the diameter of the shank, the shank 18 is retainable in the aperture 14 free of any backlash widthwise of the band 13. To remove the nut 15 from the fastening band 13, the nut 15 with its shank 18 positioned in each aperture 14 is turned through 90 degrees to the position shown in FIGS. 6(I) and 6(II). The nut 15 is thereafter slightly moved to register the flange 19 with the aperture 14, and the flange 19 is withdrawn from the aperture 14.

FIG. 8 shows a conventional device. A nut 32 is merely formed with a tongue 33 at each of its opposite ends, while a band 34 has apertures 35 in its opposite ends. The band 34 is a substantially U-shaped strip of thin steel sheet and has its opposite ends biased outward away from each other. To install the parts in place, the opposite ends of the band 34 held by the hand to clamp the nut 32 therebetween with the tongues 33 engaged in the apertures 35 are inserted into a housing, and a bolt in the housing is screwed into the nut 32. Accordingly before the bolt is screwed into the nut 32 to pull the nut into the housing the band 34 must be held by the hand in engagement with the nut 32. This procedure is troublesome to follow. Further when the nut holding bolt loosens, the opposite ends of the band 34 are liable to expand outward to release the nut 32, with the resulting likelihood that the lever assembly will drop off the handle bar.

What is claimed is:

1. A device for mounting a lever assembly on a handlebar for use in bicycles or motor cycles comprising a housing pivotably supporting an operating lever, a fastening band fittable around the handlebar to mount the housing on the handlebar, and a nut having an ear provided at each of its opposite ends and engaged in an aperture formed in each of the opposite ends of the fastening band, the nut being drawable into the housing by a bolt provided within the housing and in screwthread engagement with the nut to fasten the band to the handlebar, the ear including a cylindrical shank projecting from each end of the nut and a flange formed at the outer end of the shank, the shank being formed in its length longer than the thickness of the band, the flange being elongated to a substantially rectangular form in a direction at right angles to the internally threaded portion of the nut, the length of the short sides of the substantially rectangular flange being equal to the diameter of the shank, and the aperture of the band substantially conforms to the shape of the flange and elongated to a substantially rectangular form longitudinal of the band, thereby when the shank of the nut is turned within the aperture to bring the internally threaded portion of the nut into alignment with the bolt, the band is engageable with the inside surface of the flange.

* * * * *